(12) United States Patent
Rodigast et al.

(10) Patent No.: US 7,283,197 B2
(45) Date of Patent: Oct. 16, 2007

(54) APPARATUS AND METHOD FOR SYNCHRONIZING AN AUDIO SIGNAL WITH A FILM

(75) Inventors: René Rodigast, Tantenhain (DE); Marco Munderloh, Langewiesen (DE); Thomas Sporer, Fuerth (DE); Michael Beckinger, Erfurt (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 39 days.

(21) Appl. No.: 11/281,943

(22) Filed: Nov. 17, 2005

(65) Prior Publication Data

US 2006/0087458 A1 Apr. 27, 2006

Related U.S. Application Data

(63) Continuation of application No. PCT/EP2004/04602, filed on Apr. 30, 2004.

(30) Foreign Application Priority Data

May 20, 2003 (DE) ............... 103 22 722

(51) Int. Cl.
*G03B 31/00* (2006.01)
(52) U.S. Cl. ............ 352/12; 352/5
(58) Field of Classification Search ........ 352/5, 352/11, 12, 17
See application file for complete search history.

(56) References Cited

U.S. PATENT DOCUMENTS 4,503,470 A 3/1985 Mita et al.

6,546,190 B1 4/2003 Phillips et al.

FOREIGN PATENT DOCUMENTS

| EP | 0 176 324 A1 | 4/1986 |
|---|---|---|
| JP | 03214487 A | 9/1991 |
| WO | WO94/24817 A | 10/1994 |
| WO | WO 02/15583 A1 | 2/2002 |

OTHER PUBLICATIONS

Berkhout, A.J. et al.; "Acoustic control by wave field synthesis"; The Journal of the Acoustical Society of Amercia; May 1993; pp. 2764-2778; No. 5; New York, US.

*Primary Examiner*—Rodney Fuller
(74) *Attorney, Agent, or Firm*—Daniel J. Santos

(57) ABSTRACT

A device for synchronizing an audio signal with a film comprising frames having imprinted time codes. A detector detects the imprinted time code for the sequence of frames to obtain a detected sequence of time codes. A time code generator generates a sequence of synthesis time codes based on an initial value. A decoder decodes a time code of the detected sequence of time codes obtain the initial value. A comparator compares a detected time code and a corresponding synthesis time code and, when a phase deviation is found to be above a deviation threshold value, a time code manipulator manipulates the synthesis time code for this frame in so far that it is changed with regard to its temporal length. An audio processor provides the samples of the audio signal associated with this frame in a time-controlled way in response to a detection of the synthesis time code for a frame.

18 Claims, 7 Drawing Sheets

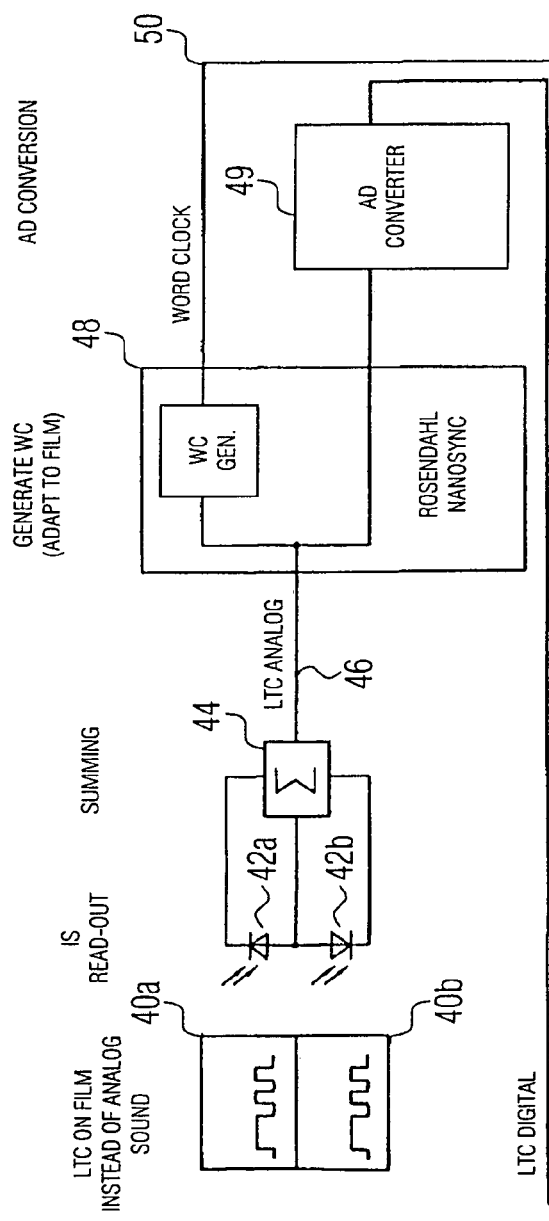
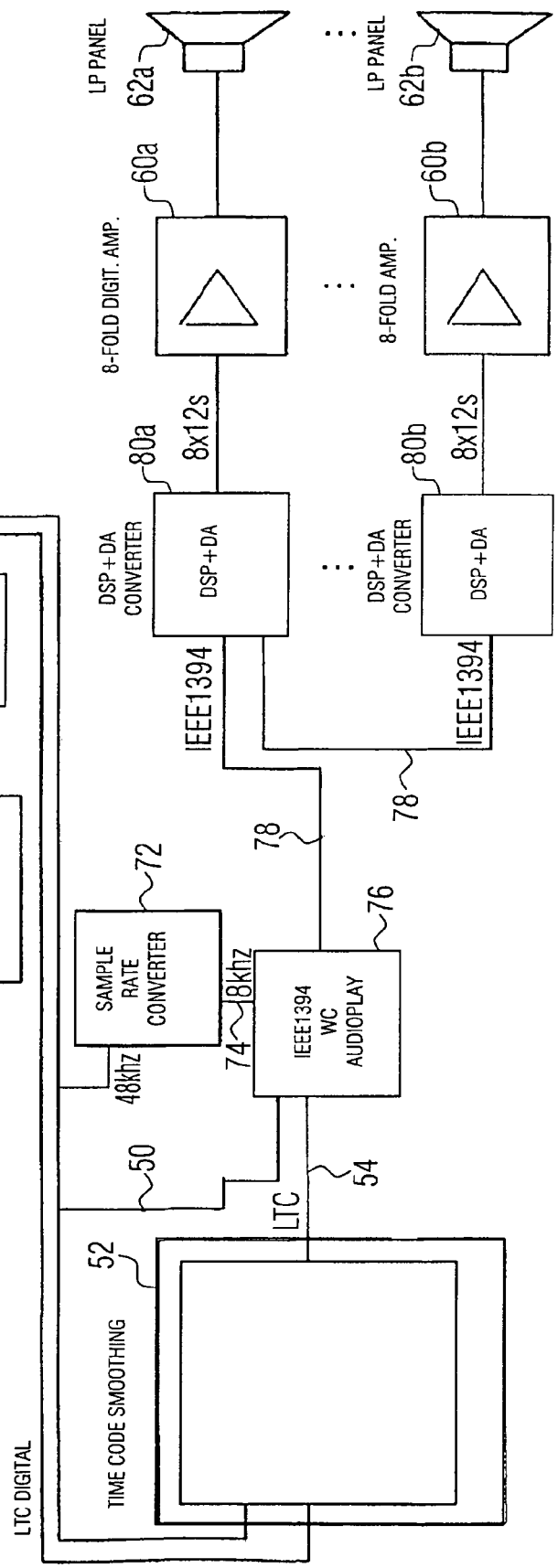
FIGURE 5

FIGURE 7A

ARE STILL SAMPLES PRESENT FOR EBi AND HAS TIME CODE FOR EBi+1 ALREADY ARRIVED? (SYNTH. TC FOR EBi WAS MANIPULATED AND SHORTENED)

DISCARD THE REMAINING SAMPLES FOR EBi AND PROVIDE THE SAMPLES FOR EBi+1

FIGURE 7B

THE BUFFER FOR EBi IS EMPTY AND THE TIME CODE FOR EBi+1 IS NOT YET HERE. (SYNTH. TC FOR EBi WAS MANIPULATED AND LENGTHENED)

INSERT SYNTHESIS SAMPLES E.G. BY REPEATING ONE OR SEVERAL SAMPLES FOR EBi

US 7,283,197 B2

APPARATUS AND METHOD FOR SYNCHRONIZING AN AUDIO SIGNAL WITH A FILM

CROSS-REFERENCE TO RELATED APPLICATION

This application is a continuation of co-pending International Application No. PCT/EP2004/04602, filed Apr. 30, 2004, which designated the United States and was not published in English, which claimed priority to German Patent Application No. 10322722, filed on May 20, 2003, and which is incorporated herein by reference in its entirety.

BACKGROUND OF THE INVENTION

1. Field of the Invention

The present invention relates to cinema film or video film applications, respectively, and in particular to the synchronization of an audio signal comprising samples associated with each frame of the film, comprising frames of the cinema or video film, respectively.

2. Description of the Related Art

There is a rising demand for new technologies and innovative products in the area of entertainment electronics. Here, it is an important prerequisite for the success of new multimedia systems to provide optimum functionalities or capabilities, respectively. This is achieved by the use of digital technologies and in particular of computer technology. Examples for this are the applications which offer an improved realistic audiovisual impression. With present audio systems a main disadvantage is the quality of the spatial sound reproduction of natural but also of virtual environments.

Methods for a multi-channel loudspeaker reproduction of audio signals have been known and standardized for years. All conventional technologies have the disadvantage that both the setup location of the loudspeakers and also the position of the listener are already integrated in the transmission format. With a wrong arrangement of the loudspeakers with regard to the listener, the audio quality suffers substantially. An optimum sound is only possible in a small area of the reproduction space, the so-called sweet spot.

A better natural room impression and a stronger enveloping in audio reproduction may be achieved with the help of a new technology. The basics of this technology, the so-called wave-field synthesis (WFS), were researched at the TU of Delft and first presented in the late 80ies (Berkhout, A. J.; de Vries, D.; Vogel, P.: Acoustic control by Wave-field Synthesis. JASA 93, 1993).

As a consequence of the enormous requirements of this method with regard to computer power and transmission rates, the wave-field synthesis has hitherto been only rarely used in practice. Only the advances in the areas of microprocessor technology and audio encoding today allow the use of this technology in concrete applications. First products in the professional area are expected next year. In a few years also first wave-field synthesis applications for the consumer area are to hit the market.

The basic idea of WFS is based on the application of the Huygen Principle of Wave Theory:

Every point on a propagating wave-front serves as the source of a wavelet propagating in a spherical or circular form, respectively.

If applied to acoustics, any form of an incoming wavefront may be reproduced by a large number of loudspeakers arranged next to each other (a so-called loudspeaker array).

In the simplest case of an individual punctual source to be reproduced and a linear arrangement of the loudspeakers, the audio signals of every loudspeaker have to be supplied with a time delay and an amplitude scaling so that the reflected sound fields of the individual loudspeakers are correctly overlaid. With several sound sources, for each source the contribution to each loudspeaker is calculated separately and the resulting signals are added. If the sources to be reproduced are in a room with reflecting walls, then also reflections have to be reproduced as additional sources via the loudspeaker array. The effort in calculating thus strongly depends on the number of sound sources, on the reflection characteristics of the recording room and on the number of loudspeakers.

The advantage of this technology is in particular that a natural spatial sound impression is possible via a large area of the reproduction room. In contrast to known technologies, direction and distance from sound sources are reproduced very accurately. In a limited way, virtual sound sources may even be positioned between the real loudspeaker array and the listener.

Although the wave-field synthesis works well for environments whose conditions are known, irregularities do occur, however, when the conditions change or when the wave-field synthesis is performed on the basis of environmental conditions that do not correspond to the actual conditions of the environment.

The technology of wave-field synthesis may also be used advantageously, however, to supplement a visual perception by a corresponding spatial audio perception. Hitherto, in the production in virtual studios the provision of an authentic visual impression of the virtual scene was of top priority. The acoustic impression matching the image is usually integrated on the audio signal by manual operation steps in the so-called postproduction or classified as being too expensive and time-consuming in the realization and thus omitted. By this, there is usually a contradiction of the individual sensations which leads to the fact that the designed room, i.e. the styled scene, is perceived as less authentic.

Not only in the above briefly illustrated wave-field synthesis, in which a number of loudspeakers have to be supplied with individual sound signals which may be in a range of above 100 pieces, but also in conventional cinema applications, in which, for example, Dolby 5.1 or 7.1, respectively, is used, or also in normal stereo applications and even also in mono-applications there is always the requirement to synchronize the film and the audio material either in a home environment or, in particular, in a cinema environment.

Further, band-supported video material has to be synchronized with audio material in the studio area. For this, conventionally a standard time code for the cinema or studio operation, respectively, is used. The standard time code is also referred to as LTC (LTC=longitudinal time code) or in general as time code. The longitudinal time code as an example for any possible time code indicating a position of a frame in the sequence of frames of the film is a time code which is typically imprinted on the film material, i.e. so that each frame receives its own time code.

A possible configuration of the time code is illustrated in FIG. 2. FIG. 2 shows a sequence of frames 200, 201, 202, 203, wherein the frame 200 is referred to as a frame EBi, while the frame 201 is referred to as a frame EBi+1. FIG. 2, so to speak, shows an "unrolled" section of a film which has 24 frames per second in the example shown in FIG. 2. In a field 204, which is associated with each frame in the schematic illustration of FIG. 2, the way of counting the longitudinal time code is illustrated. The longitudinal time code, with regard to its encoded information, consists in a "time information" and a "frame information". The time information is schematically illustrated in FIG. 2 such that the frame i (200) is an image whose time information e.g. includes 10 hours, 0 minutes and 1 second. The frame information designates the first frame in this second for the image 200. Analog to that, the frame information for the frame 202 designates the $24^{th}$ frame at the "point in time" of 10 hours, 0 minutes and 1 second.

As, in the indicated embodiment in FIG. 2, it is assumed that the film has a playing frequency of 24 frames per second (also playing frequencies of 25 frames per second exist), the time information of the frame k+1 (203) is 10 hours, 0 minutes and 2 seconds, while the frame information of this frame is again equal to 1, as this is the first frame in the "new" second.

It is to be noted that the starting point of the time information may be selected randomly. If the starting point of the time information is, for example, set to 0, and if a film takes 90 minutes, then the maximum time information will be 1 hour, 30 minutes, 0 seconds. Important with regard to the time information is the fact that each frame obtains an original time code information which enables reconstructing the position of each frame in the sequence of frames, i.e. in the film.

The time information and the frame information are both encoded together by means of the time code which may be selected randomly and which is, for example, an 8-bit code of binary zeros and ones. Depending on the implementation, for a binary zero a dark spot may be imprinted on the film and for a binary one a light spot may be imprinted on the film, or vice versa. Alternatively, however, it is also possible and practicable to encode a "zero" e.g. as two short light/dark changes, and a "one" as a long light/dark change.

Audio samples are associated with each frame. When the case is considered that the film has a playing frequency of 24 frames per second, and the audio samples are present with a sample frequency of e.g. 48 kHz, then 2000 discrete audio samples are associated with each frame. These samples are typically stored externally into files and in the film reproduction digital/analog-converted synchronized to the frames, amplified and provided to the correspondingly positioned loudspeakers, for example, in the cinema.

In the cinema/film area, most different methods are used in order to synchronize the image material (video and film) with digital audio material (WAV files, MPEG-4 files ...). It is to be noted here that the audio/video material is often present in analog form and separate from each other and is to be put together accurately with regard to frames and samples after a separate digitization. For this synchronization the time code described with regard to FIG. 2 is used.

Additionally, such known systems are provided with a centrally generated and usually stable clock, also referred to as word clock. Depending on the embodiment, the frequency of this word clock is, for example, equal to the frequency using which the stored discrete samples were sampled.

As band-supported video players as well as film devices are mechanical systems whose rotational speed may vary over time, both, time code information and also word clock information imprinted on the film may only be read out in an insecure way. In particular, this information imprinted on the film is jittered after the typically optical read-out, which brings about the danger of an erroneous processing of this information taking place, which may lead to a breakdown of a system which has to operate in particular within relatively critical time constraints. As this is particularly the case with wave-field synthesis systems, in which especially the synchronous cooperation of the audio signals output by all loudspeakers is important to reconstruct corresponding wave fronts on the basis of the single waves generated by the loudspeakers.

In the prior art, different synchronization solutions are known and licensable. Thus, with the system SDDS or DTS the time information is digitally encoded and imprinted on the film perforation. There, the time code is encoded on the film. The time code is decoded in a processor and used in order to achieve a time-synchronous reproduction of image and sound. In particular, on such films a special time code track is located on the film strip. This time code is read out from the film by a special reader. An special decoder which is also required sees to it that the audio material present on CD-ROM/DVD is played synchronously to the film. The image and the analog sound, which is also referred to as optical sound, film sound or Lichtton, respectively, as it is imprinted on the film material, are arranged in a defined offset on the film strip in order to consider the delay when rendering the sound information. A synchronization is here performed manually in the processor via a setting of the delay time (Dolby A, S R).

For all such systems a special hardware is required, i.e. the special reader and the special decoder. Further, in the film copying factories for the respective method special exposure devices have to be used in order to imprint the corresponding information onto the film. There is further the fact that different synchronization/exposure concepts are not mutually compatible, so that on different films different sound formats may exist isolated from each other or next to each other such that a once copied film is as far as possible suitable for all cinema systems. It has been found, however, that the optical sound format, i.e. an optical sound track on which sound information is typically imprinted on the film, may be found on all film copies, as this optical sound guarantees an emergency variant. This means, that, if the worst comes to the worst, i.e. when the synchronization fails due to a defect of the device and the cinema is, for example, full of people, the film can nevertheless be finished, no longer on the basis of the digital sound material, however, but on the basis of the sound material imprinted on the optical sound track.

An important feature of the optical sound track is, however, as it has been implemented, the fact that the same is typically present on all film copies and that typically all film copying devices comprise means in order to imprint an optical sound track and that typically all film players have a device to optically read out the optical sound track.

One disadvantage of the described system is that these systems are typically closed systems whose functionality may not easily be determined. This is in particular problematic in so far that the known systems are not provided for any number of audio channels, but only, for example, for Dolby 5.1 or 7.1. For wave-field synthesis applications those six or eight channels, respectively, are by far not sufficient, however, so that for those systems at the moment no suitable image/sound synchronization concepts exist. It is further disadvantageous that different concepts exist which are typically not mutually compatible so that a further processing, in particular of wave-field synthesis film/sound material, is problematic.

SUMMARY OF THE INVENTION

It is the object of the present invention to provide a flexible concept for synchronizing an audio signal with a film, wherein the number of the audio channels to be synchronized may be set in a flexible way.

In accordance with a first aspect, the present invention provides a device for synchronizing an audio signal present in discrete samples with a film comprising a sequence of frames that may be played with a frame frequency, wherein each frame comprises an imprinted time code indicating a position of the frame in the sequence of frames, and wherein a predetermined number of discrete samples of the audio signal is associated with a frame, having a detector for detecting the imprinted time codes for the sequence of frames in order to obtain a detected sequence of time codes; a time code generator which is implemented to generate a sequence of synthesis time codes based on an initial value; a decoder for decoding a time code of the detected sequence of time codes in order to provide the initial value for the time code generator; a comparator for comparing the sequence of synthesis time codes with the detected sequence of time codes; a time code manipulator for changing a time length of a synthesis time code of the sequence of synthesis time codes in order to obtain a manipulated synthesis time code when the comparator determines a phase deviation between a time code of the detected sequence of times codes and a synthesis time code of the sequence of synthesis time codes which exceeds a predetermined deviation threshold value with regard to its amount; and an audio processor for a time-controlled provisioning of the predetermined number of discrete samples of the audio signal associated with a frame when the audio processor detects a synthesis time code or a manipulated synthesis time code identifying the frame.

In accordance with a second aspect, the present invention provides a method for synchronizing an audio signal present in discrete samples with a film comprising a sequence of frames that may be played with a frame frequency, wherein each frame comprises an imprinted time code indicating a position of the frame in the sequence of frames, and wherein a predetermined number of discrete samples of the audio signal is associated with a frame, with the steps of detecting the imprinted time codes for the sequence of frames in order to obtain a detected sequence of time codes; generating a sequence of synthesis time codes based on an initial value; decoding a time code of the detected sequence of time codes in order to provide the initial value; comparing the sequence of synthesis time codes with the detected sequence of time codes; changing a time length of a synthesis time code of the sequence of synthesis time codes in order to obtain a manipulated synthesis time code when a phase deviation between a time code of the detected sequence of times codes and a synthesis time code of the sequence of synthesis time codes is determined which exceeds a predetermined deviation threshold value with regard to its amount; and providing the predetermined number of discrete samples of the audio signal associated with a frame in response to a detection of a synthesis time code or a manipulated synthesis time code identifying the frame.

In accordance with a third aspect, the present invention provides a computer program having a program code for performing the above-mentioned method, when the program runs on a computer.

The present invention is based on the finding that the flexibility for a synchronization of any number of audio channels with a film may be achieved by the fact that the time code imprinted on the film is not itself used for synchronizing the one or the several audio processing means, but only for generating a initial value for an individual time code generator and in order to manipulate the synthesis time codes generated by the time code generator in case of a phase deviation of the same which is too large to the corresponding read-out time codes with regard to their time length, such that the one or the several audio processing means to be synchronized are not synchronized with the typically optically detected time codes but with a sequence of synthesis time codes or manipulated synthesis time codes, respectively, comprising the defined edge steepnesses, so that a reliable detection of the time codes becomes possible for the frames by the audio processing means.

In other words, according to the invention the complete time code for the frames is newly generated, wherein, however, the time code detected by the film is used on the one hand in order to provide a initial value of the time code generator and on the other hand to counteract phase deviations by manipulation, i.e. lengthening or shortening the synthesis time codes.

In the preferred embodiment of the present invention, the time codes are either directly imprinted on the typically always present optical sound track or embedded into the optical sound in a psychoacoustically masked way.

In a further preferred embodiment, the manipulation means is implemented such that it does correct the complete offset by causing a relatively strong shortening or lengthening of a synthesis time code, respectively, but that always only a relatively small shortening/lengthening of a synthesis time code is performed in order to reduce artefacts in audio reproduction or even eliminate the same completely, respectively. It is to be noted here that the omission or repetition of one or a small number of audio samples is not perceived as cracking or something similar by the listener. In this preferred embodiment, thus a phase offset is not corrected "in one go", but only "gradually", in order to prevent artefacts.

In a further preferred embodiment of the present invention, the synthesis time code manipulation means is implemented in order to be clocked by a work clock, whose frequency depends on the playing frequency with which the frames are provided. In this case already a coarse correction of the playing frequency fluctuation inevitable due to the used mechanical systems is obtained, wherein the manipulation of the synthesis time codes then only has to receive fluctuations occurring between two points in time in which the work clock is newly updated.

In a further embodiment of the present invention for each audio channel contained in the audio signal an individual audio processing means is provided, wherein each audio processing means is provided with a copy of the sequence of synthesis time codes and manipulated synthesis time codes, such that a time-synchronous playing of all audio channels on the one hand and a time-synchronous playing of the audio channels with regard to the film material on the other hand is achieved. Alternatively, also one single audio processing means may be provided which lays any audio channels onto a transmission bus controlled by the sequence of synthesis time codes or manipulated synthesis time codes, respectively, to which reproduction means for the present loudspeaker channels are connected. This transmission bus is preferably a fire-wire bus according to the standard IEEE 1394.

The present invention is advantageous in particular in so far that, based on the defined quality of the synthesis time codes or the manipulated synthesis time codes, respectively, a reliable operation of the audio processing devices may be achieved which is independent of how strongly damaged/polluted the time codes on the film material are. In addition to that, any high number of copies of those digital synthesis time codes or manipulated synthesis time codes, respectively, is possible so that any number of audio signal providers (or audio players or Audiozuspieler, respectively) may be synchronized.

It is a further advantage of the present invention that with regard to the requirements for film copying devices on the one hand and film playing devices on the other hand, hardware present in conventional film copying entities or film playing environments may be reverted to, so that a fast and extensive distribution of the inventive concept may take place without compatibility obstacles.

BRIEF DESCRIPTION OF THE DRAWINGS

Preferred embodiments of the present invention are explained in more detail in the following with reference to the accompanying drawings, in which:

FIG. 5 shows a block diagram illustration of an inventive total system according to an alternative embodiment;

FIG. 7a shows a detailed illustration of the functionality of the modification controller for shortened manipulated synthesis time codes; and FIG. 7b shows a detailed illustration of the functionality of the modification controller for lengthened manipulated synthesis time codes.

DESCRIPTION OF THE PREFERRED EMBODIMENTS

Figure 1:
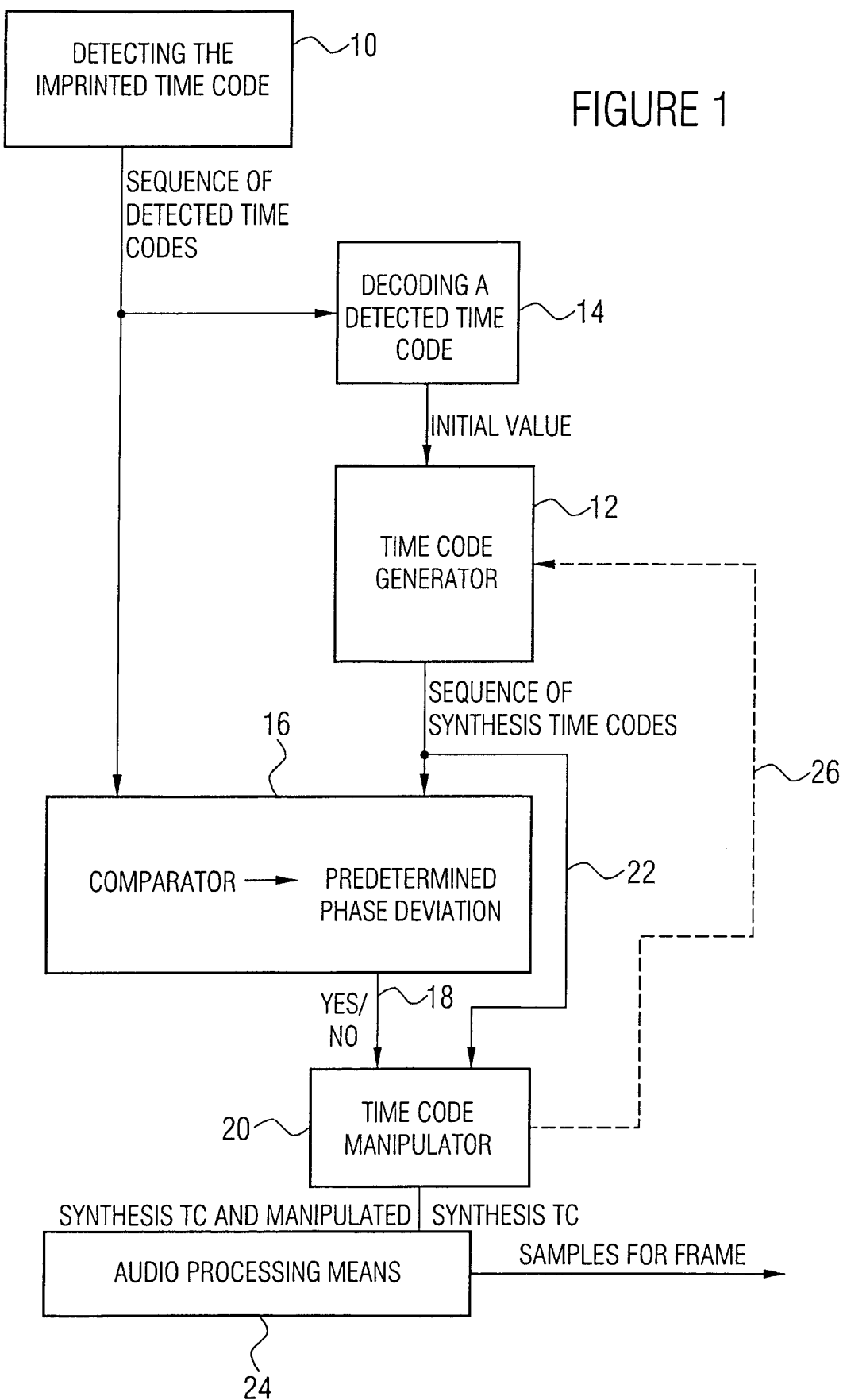
FIG. 1 shows a block diagram of the inventive device for synchronizing.
Figure 2:
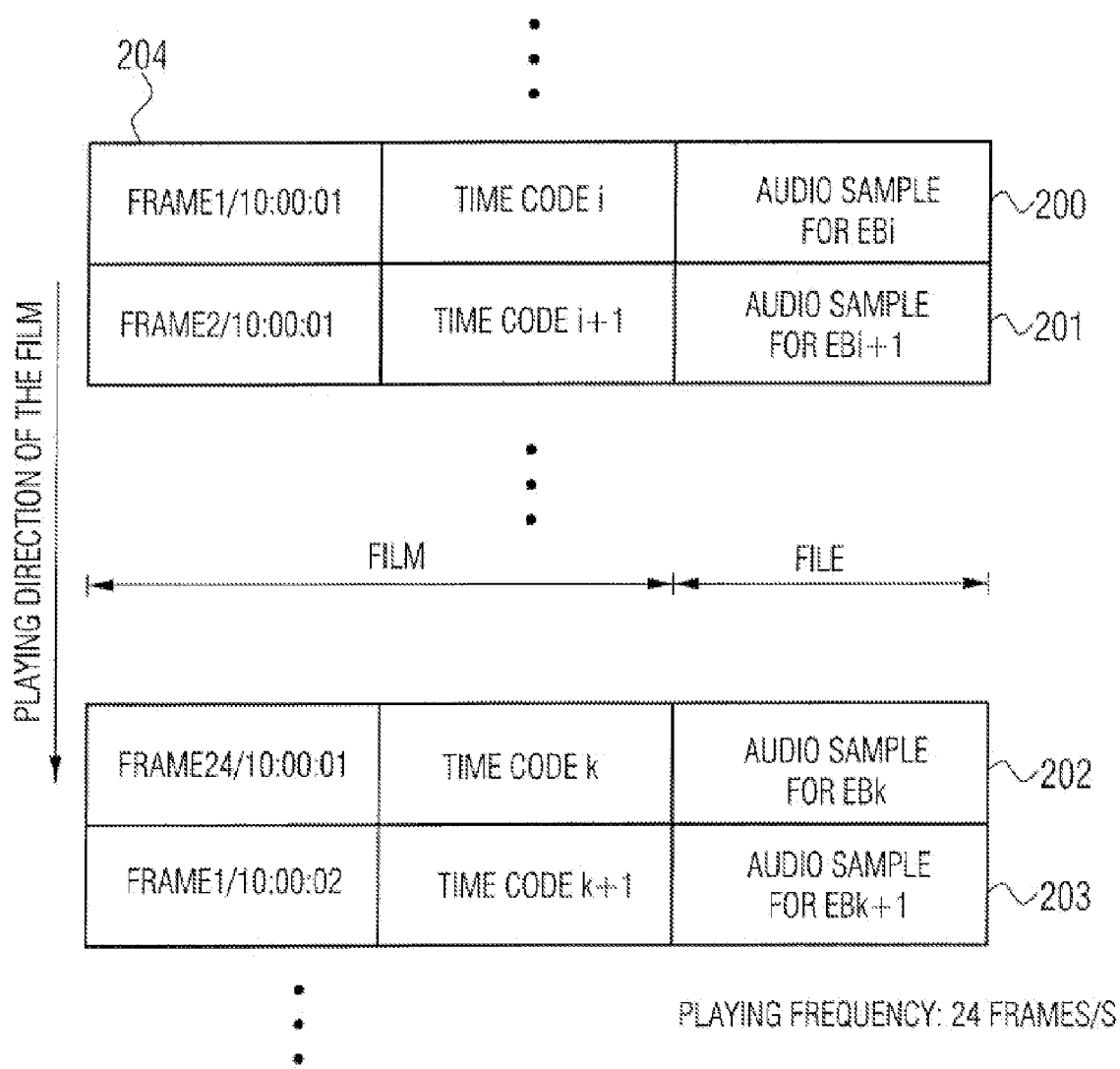
FIG. 2 shows a schematic illustration of a typical linear time code.

FIG. 1 shows a block diagram of a preferred embodiment of a device for synchronizing an audio signal, present in discrete samples, with a film comprising a sequence of frames which may be reproduced with an frame frequency. As it was illustrated with reference to FIG. 2, each frame includes an imprinted time code which indicates a position of the frame in the sequence of frames. Further, a predetermined number of discrete samples of the audio signal is associated with each frame. If a frame reproduction frequency of 24 frames per second is selected, and if the audio signals are based on a sample frequency of 48 kHz, then a number of 2000 discrete audio samples is typically associated with a frame.

FIG. 1 shows means 10 for detecting the imprinted time codes for the sequence of frames. Means 10 for detecting provides on the output side a sequence of detected time codes. The device shown in FIG. 1 further includes a time code generator 12 which is implemented in order to generate a sequence of synthesis time codes based on a initial value. This initial value is provided from the sequence of detected time codes at the output of means 10 by a decoder 14 for decoding a time code of the detected sequence of time codes.

The time code generator 12 generates a sequence of synthesis time codes on the output side which is supplied at the output of means 10 to a comparator 16, like the sequence of detected time codes. The comparator 16 is implemented to perform, preferably for each pair consisting of a detected time code and a corresponding synthesis time code, i.e. for a detected time code for the frame i, for example, and the synthesis time code for the frame i, for example, a phase comparison in order to determine whether the two time codes are offset in time, i.e. phase-shifted, or more or less coincide in time.

At this point it is to be noted that the detected time code will not have a very accurately defined signal shape to which audio processing means may be reliably synchronized, due to the fact that it was detected by the film typically by optical means. Nevertheless, a minimum of rising and falling edges will be detectable. Should the detected time code be very strongly corrupted, then it is nevertheless possible to perform a reconstruction for the purpose of phase comparison based on the fact that its shape is known and exactly corresponds to the shape of the parallel synthesis time code. In addition to that it is noted that the time code typically extends across the complete frame on the film and thus comprises a plurality of rising and falling edges in a pattern defined by the time code itself. As for the phase comparison, in principle only one individual edge or one individual zero passing, respectively, is required (when the position of the edge in the time code itself is known), a phase comparison may be performed also with strongly corrupted detected time codes. Should a time code be corrupted so strongly that no phase comparison may be performed, then this is also unproblematic, as then, using the parallel synthesis time code, no manipulation is performed and the comparison for the next detected time code in the sequence is again performed with the next synthesis time code in the sequence, i.e. so long until a detected time code has again been determined on the basis of which a successful phase comparison is possible.

If the comparator 16 determines that between a pair consisting of a detected time code and a synthesis time code a phase deviation is present, which exceeds a predetermined deviation threshold value with regard to its amount, i.e. if on an output line 18 an acknowledgement signal (yes) is output to a time code manipulator 20, then the time code manipulator will manipulate the current synthesis time code in which this deviation was determined and which is provided via a line 22 to the time code manipulator 20. If a no-signal is transferred across the line 18 from the comparator 16 to the manipulator 20, then the currently regarded synthesis time code is not manipulated and is simply passed on as a synthesis time code to an audio processing means 24 for synchronization purposes.

The time code manipulator 20 is thus implemented in order to change a time length of a synthesis time code of the encountered synthesis time codes in order to obtain a manipulated synthesis time code when the comparator 16 determines a phase deviation between a time code of the detected sequence of time codes and a synthesis time code which exceeds a predetermined deviation threshold value with regard to its amount. The change of the time length of the synthesis time codes takes place so that a phase deviation between a synthesis time code following after the manipulated synthesis time code and a corresponding detected time code is reduced.

Depending on the phase comparison result, the synthesis time code is manipulated so that it is lengthened when the synthesis time code generator 12 ran too fast compared to the sequence of detected time codes. If the synthesis time code generator 12 ran too slowly compared to the detected sequence of time codes, then the manipulation of synthesis time codes consists in a shortening of the standard time code usually output by the time code generator.

At the output of the time code manipulator 20, thus a sequence of synthesis time codes and manipulated synthesis time codes results, which is supplied to the audio processing means 24. The audio processing means 24 is implemented in order to perform a time-controlled provisioning of the predetermined number of discrete samples of the audio signal associated with a frame, when the audio processing means detects a synthesis time code or a manipulated synthesis time code, respectively, associated with the frame. Preferably, a synchronization is performed for each frame. For less quality-intensive applications, however, also a synchronization only, for example, for every second, third, fourth, etc. frame may be performed. This may be achieved by always only considering certain time codes from the sequence of synthesis time codes and manipulated synthesis time codes from the audio processing means 24. Alternatively, however, also a corresponding functionality may be achieved by only generating a synthesis time code or a manipulated synthesis time code, respectively, for example for every fourth detected time code.

Figure 3:
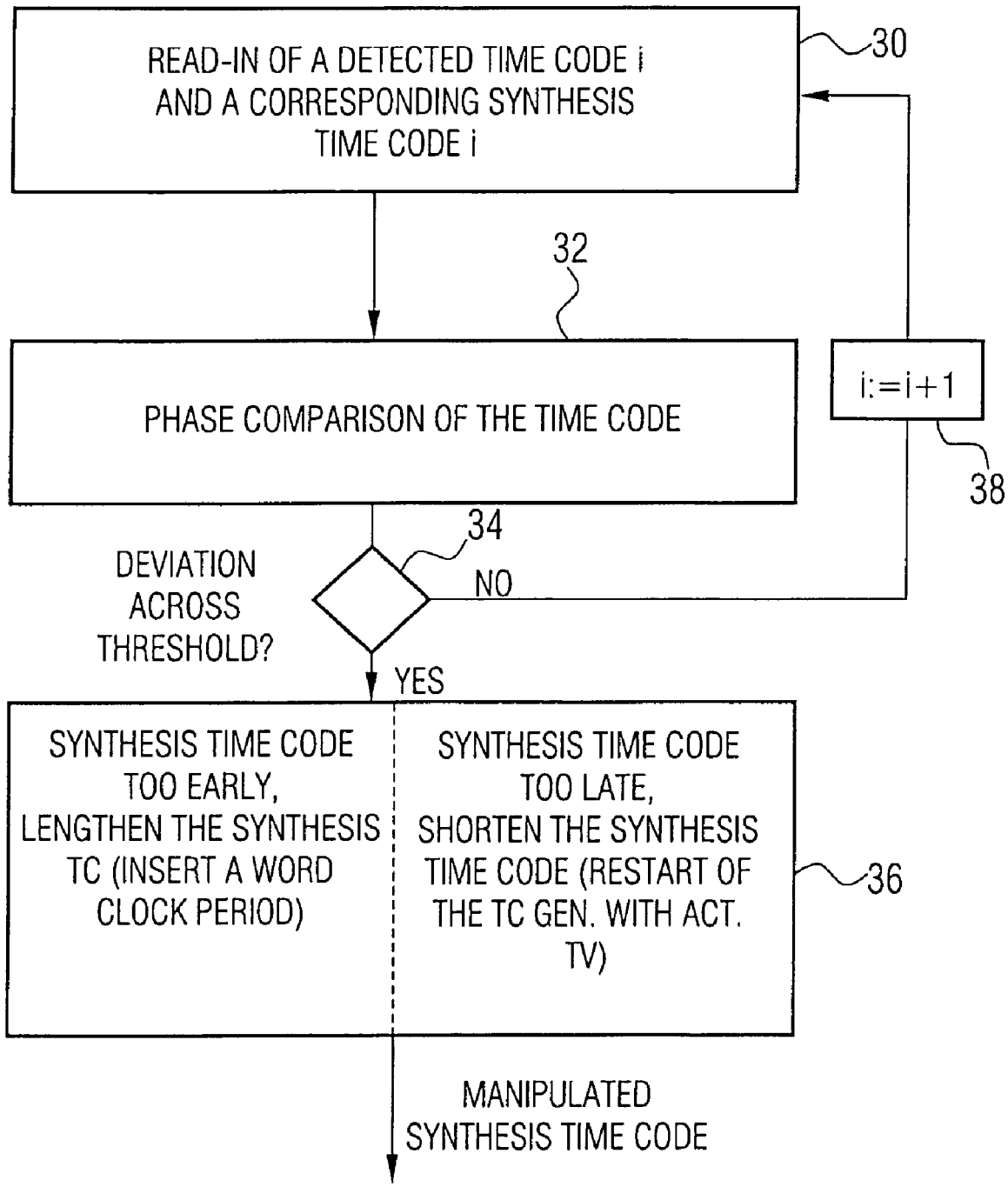
FIG. 3 shows a detailed illustration of the functionality of the comparator and the time code manipulator of FIG. 1.

In the following, with reference to FIG. 3, the functionality of the comparator 16 and the time code manipulator 20 of FIG. 1 is explained in more detail. In a first step 30, the comparator reads in a detected time code i and a corresponding synthesis time code i with regard to a reference point in time, like, for example, an event in a clock cycle of a word clock which is described later. As a clock event, for example, a rising edge, a falling edge or, depending on the implementation, a zero passing of the word clock may be employed.

In the following, a phase comparison of the time codes is performed in order to determine whether a phase offset between the synthesis time code and the detected time code is present. As it was implemented, a time code, extending, for example, across a complete frame or arranged in an (e.g. front) area of a frame, depending on the implementation of the film projector, includes a defined sequence of rising and falling edges encoding both the frame information and also the time information, as it was illustrated with regard to FIG. 2. The detected time code typically does not have a very nice shape, as it was read out optically. In particular, it is jittered and noisy. In contrast to that, the synthesis time code, as it was generated by an individual digital synthesis time code generator, has a defined clearly specified shape with regard to the edge steepnesses which are neither noisy nor jittered.

Further, the sequence of rising and falling edges is identical in the detected time code and in the synthesis time code, as both codes to be compared encode the same frame information and time information. A phase comparison may thus take place in so far that it is determined whether the synthesis time code with regard to the detected time code is shifted in time either in a positive or in a negative direction, i.e. has a positive or negative phase offset, respectively. If this phase comparison performed in a step 32 of FIG. 3 provides a phase deviation which is above a threshold, which is decided in a decision box 34, the process continues with a step 36 which is discussed in the following. If the decision block 34 determines, however, that the deviation is below the threshold, then the step 30 is performed for the pair of the next detected time code and the next synthesis time code, which is symbolically illustrated by the increment box 38.

If the deviation is above the threshold, then it is further determined whether the synthesis time code is too early, i.e. whether the time code generator 12 runs too fast with regard to the encountered detected time code. If this is the case, then the synthesis time code is lengthened, i.e. preferably by only inserting one individual word clock period preferably at the end of the synthesis time code. If it is determined, however, that the synthesis time code is to late, so that the time code generator 12 of FIG. 1 is too slow with regard to the sequence of detected time codes, then the synthesis time code which caused the phase deviation is shortened. This preferably takes place by restarting the time code generator 12, as it is schematically illustrated by a dashed line 26 in FIG. 1, i.e. using the valid initial value for the next time code.

The lengthening or shortening, respectively, of a synthesis time code is thus typically expressed by the fact that the last impulse of the time code becomes somewhat shorter or somewhat longer, respectively. This is not problematic, however, for a time code decoder if real conditions are regarded. If it is assumed that frames are played with a frequency of 24 Hz and that a time code extends across a complete frame, and that a time code has a length of 8 bits, wherein for each bit two time code clock periods are due, then the frequency of the signal that underlies the time code is about 384 Hz. In contrast to that, the word clock by which the synthesis time code generator is operated is typically at 48 kHz. This means that 125 word clock periods fall onto one time code clock period. A deviation in so far that the last time code period is now 124 or 126 periods long instead of 125 periods is not problematic for subsequent decoder circuits.

Figure 4:
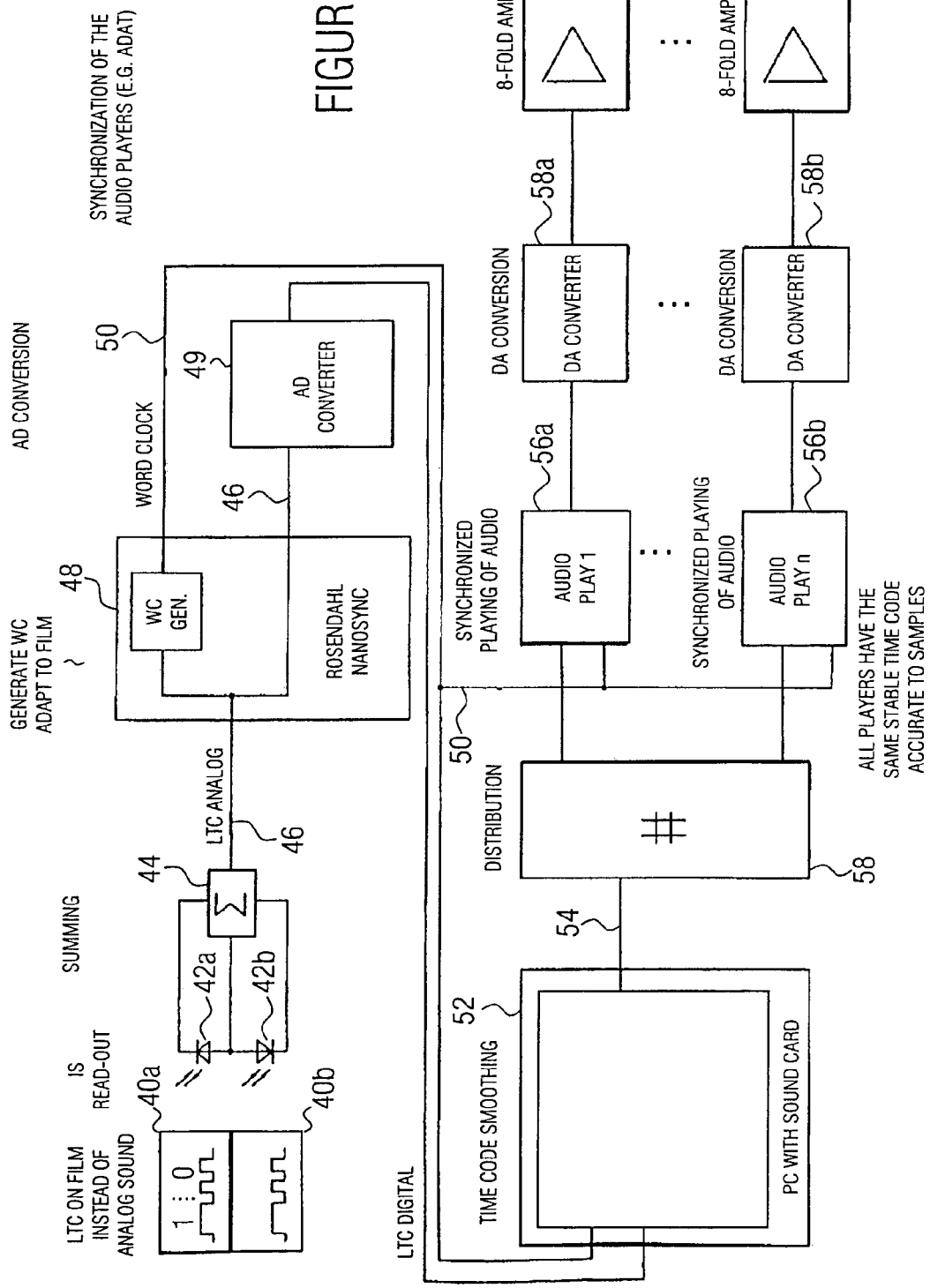
FIG. 4 shows a block diagram illustration of an inventive total system according to an embodiment of the present invention.

FIG. 4 shows a total system of a preferred embodiment of the present invention for a synchronization of the audio signal provider with the so-called adat standard. At the top left in FIG. 4, a time code 40 imprinted on the film is illustrated. In the embodiment shown in FIG. 4, a logical "1" is encoded by a long light or dark impulse, respectively, while a logical "zero" is encoded by two short light or dark impulses, respectively. Means 10 for detecting shown in FIG. 1 is implemented in this embodiment to read out the time codes directly imprinted on the film, for example using a photo detector (e.g. photodiode) 42a. For redundancy reasons, in the embodiment shown in FIG. 4, further a second time code track 40b is used on the film which is read out by a second photodiode 42b. The results of the two photodiodes are then summed in a summator 44 in order to output the sequence of detected time codes to an output 46. The sequence of detected time codes is also designated by "LTC analog" like in FIG. 4.

In the embodiment shown in FIG. 4, further means 48 for generating a word clock WC having a word clock frequency is present, wherein means 48, as it is shown from FIG. 4, is implemented to operate based on the sequence of detected time codes, so that the word clock frequency is adapted to the frame frequency which is finally contained in the sequence of detected time codes. Means 48 thus provides the word clock 50 on the output side and a sequence of detected time codes supplied on the input side, which is simply passed through means 48.

Preferably, as a means for generating the word clock, a known word clock generator known in the art under the term of "Rosendahl-Nanosync" is used. The functionality of this word clock generator 48 consists in extracting a current frame frequency from the sequence of detected time codes. This may, for example, be performed by always determining the first clock edge of a detected time code and then determining, on the basis of a message about time distances of those first edges, a current frequency of the frames. In a preferred embodiment, the frame frequency is 24 frames per second. In this embodiment, the word clock should have a word clock frequency which is 48 kHz for a frame frequency of exactly 24 Hz. This means that the word clock is selected so that in the ideal case 2000 word clock cycles are present within one frame. Based on the typically occurring mechanical fluctuations of the film projector, the film projector is not always operated with exactly 24 Hz but may operate in a fluctuation range extending to values smaller than 24 Hz and values greater than 24 Hz.

In the embodiment of the present invention illustrated in FIG. 4, this fluctuation is already considered by the fact that the word clock is updated at certain points in time, for example every 5 to 15 seconds and preferably every 10 seconds. The generator 48 is here implemented in order to determine the mea frame frequency in the period of time and, for example, to set the word clock frequency based on a fixed factor, like, for example, 2000. Depending on the fluctuation of the frame frequency, the word clock frequency will thus, for example, fluctuate between 47.995 kHz and 48.005 kHz based on the current frame frequency.

In the word clock generator 48, the analog/digital converter is connected downstream in order to analog/digital-convert the sequence of detected time codes present in an analog form and to feed the same into a time code smoothing device 52 which will typically be implemented in a PC with a sound card. The time code smoothing device 52 combines the elements 12, 14, 16, 20 of FIG. 1 and provides the sequence of synthesis time codes or manipulated synthesis time codes, respectively, on the output side, i.e. at an output 54. In the embodiment shown in FIG. 4, the audio signal present in discrete samples not only includes one audio channel but n audio channels. The audio channels are typically stored in the audio processing means 56a, 56b. An audio processing means 56a or 56b, respectively, in the embodiment shown in FIG. 4, would correspond to the audio processing means 24. The sequence of synthetically generated synthesis time codes or manipulated synthesis time codes, respectively, on line 54 is supplied to a distributor 58 which performs a copy of the sequence and simultaneously supplies a distribution of the sequence to all audio players 56a, 56b. Thus it is guaranteed that all players receive the same stable time code accurately to the sample. Each audio processing means is further supplied with the word clock 50 in the embodiment shown in FIG. 4, such that for every clock cycle of the word clock 50 each audio processing means provides a sample of the corresponding audio channel and the corresponding frame to a downstream digital/analog converter 58a or 58b, respectively. The digital/analog converted samples are then preferably amplified by an 8-fold amplifier per branch 60a, 60b and supplied to the corresponding loudspeaker panel 62a, 62b. A loudspeaker panel either includes one or a group of neighboring loudspeakers which are all to be controlled using the same audio channel.

On the film strip, the standard time code is imprinted in analog form preferably onto the optical sound track present typically in all formats. For this, preferably the analog time code also known as the LTC is used, wherein this time code is present in normal studio environments, so that no new hardware is required for generating this time code.

Normal copying entities are able to imprint analog tracks onto the film. In so far, the time code to be exposed occurs as an analog audio material for such copying entities. Thus, also for copying entities no new hardware is required.

In typical film theatres, cinema machines are always equipped with optical sound readers (analog readers). Thus, the time code imprinted on the film may again be read out using those conventional readers, so that no special reader is required for the detected system. By means 42a, 42b, 44 the time code is now read out and adapted with regard to its level. This is usually performed by a microphone preamplifier performing a level conversion, so that, for example, a level of approximately 20 mV is converted to a level of e.g. 0.775 V.

The sync reference generator (Rosendahl-Nanosync) 48 serves to generate a clock from the time code read from the film and to adapt its frequency to the film. The clock signal is a word clock known to persons skilled in the art which is usually used in studio environments.

The read-out time code is still not stable due to the provision via a mechanically-based system, i.e. it fluctuates, it is jittered and it is in particular non-stable with regard to frequency.

By the analog/digital converter 49 the sequence of detected time codes still present in analog form is sampled and quantized (digitized) on the line 46 and smoothed and stabilized in the time code smoothing device 52, as it is explained in the following for a preferred embodiment of the present invention.

First of all, the digitized analog time code is decoded for a frame and compared to an internally generated purely digital time code generated by the time code generator 12 of FIG. 1. This internal time code continually runs forward and is preferably clocked by the word clock which is preferably not constant but is tracked by the word clock generator 48 according to the playing frequency of the frames.

As the external word clock is adapted to the speed of the incoming analog time codes on line 46 and thus to the speed of the film, the internally generated time code (time code generator 12 of FIG. 1) and the external time code (on line 46 of FIG. 4) already run almost synchronously. The use of the word clock generator 48 in order to generate a word clock dependent on the film playing speed thus already provides a coarse synchronization.

In order to smooth fluctuations still present between the sequence of detected time codes and the sequence of synthesis time codes, continuously the difference between the internal and external time codes is compared, wherein, in the case in which too great a difference is present, the internal time code generator is preferably restarted using the current external time code. The current external time code is thus used as an initial value for a restart of the time code generator 12 of FIG. 1.

This automatically means that the time code already generated before by the time code generator is not written completely but ends slightly earlier as it was discussed above. By the restart of the time code generator thus the synthesis time code generated directly before the restart of the time code generator is manipulated.

In a preferred embodiment of the present invention, an artefact-reduced time code synthesis code approximation is achieved. Here, the fact is made use of that slightest jumps of a sample are not noticeable as cracks in the sound. If the internal and the external time code diverge, in the internally generated time code a period of the word clock is omitted or a period of the word clock is inserted, respectively, which leads to the fact that all audio processing means or audio players, respectively, jump around a sample, i.e. either omit a sample or repeat a sample, so that their playing position slowly adapts to the correct time position. This is the case as the audio processing means or the several audio processing means, respectively, are also controlled using the word clock such that they always provide the next audio sample for a certain event in the clock cycle of the word clock, for example with a rising edge, with a falling edge or with a zero passing.

As the internal time code, i.e. the sequence of synthesis time codes and manipulated synthesis time codes is generated digitally and thus comprises defined steep edges, all audio processing means or audio players, respectively, may be synchronized to those edges via their integrated time code decoder. Here, the position of the last decoded time code is determined in the input buffer of the audio processing means or audio players, respectively, clocked via the word clock, in order to calculate the point in time at the beginning of the next buffer to be played from this. This point in time is compared to the real playing position and is automatically adapted based on the manipulated synthesis time code sample if an offset is present.

In this way, any number of connected audio players may be synchronized, so that any number of audio tracks or audio channels, respectively, may be synchronized for one film.

Figure 6:
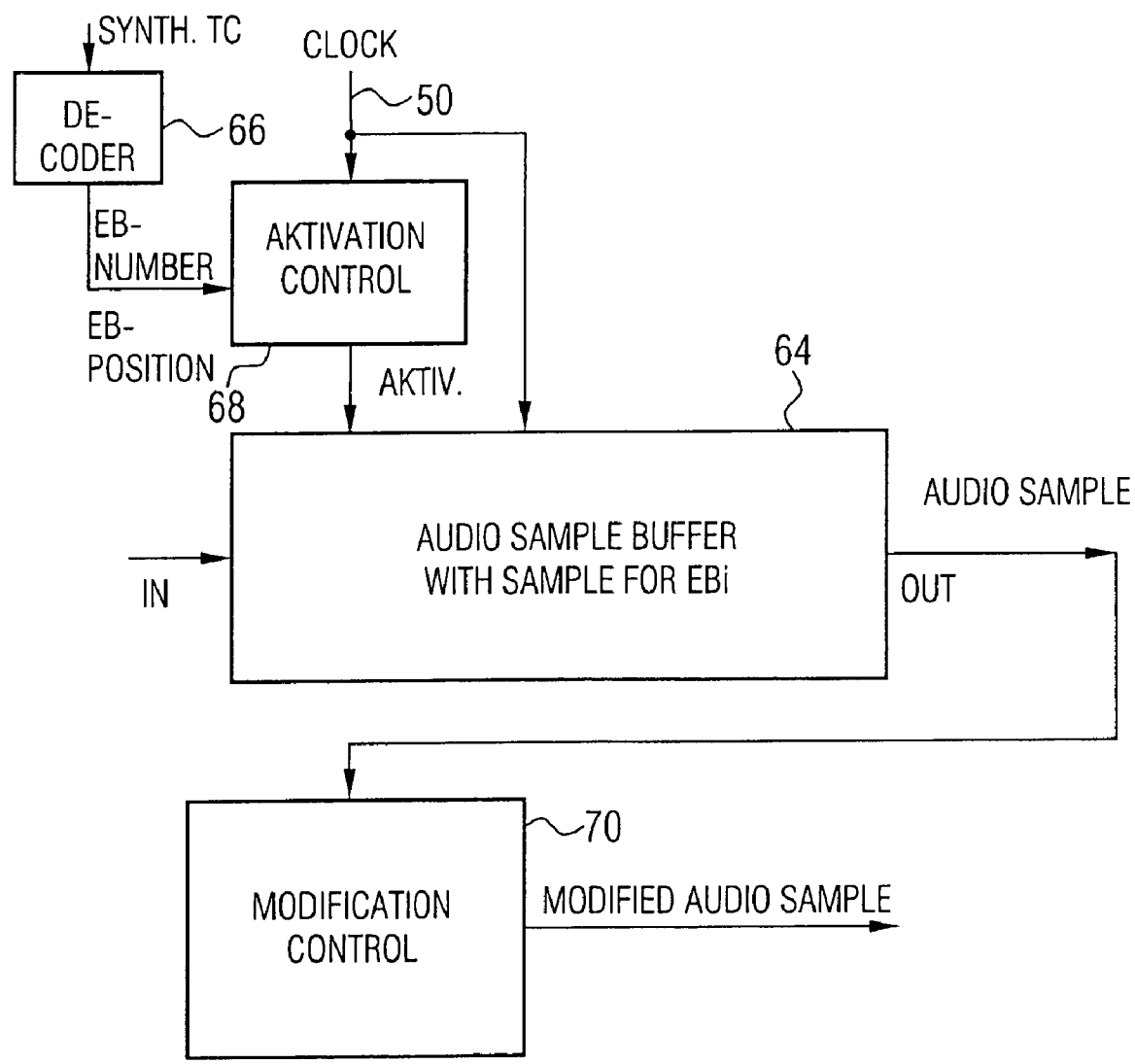
FIG. 6 shows a detailed illustration of the audio processing means of FIG. 1 according to a preferred embodiment of the present invention.

In this respect, with regard to FIG. 6, a preferred implementation of the audio processing means 24 or the audio processing means 56a, 56b of FIG. 4, respectively, is illustrated. Each audio processing means includes an audio sample buffer in which at least the audio sample for the frame (EBi) are stored. The buffer is indicated by 64 in FIG. 6. At the input side, the audio processing means 24, as it may be seen in FIG. 1, receives a synthesis time code or a manipulated synthesis time code, respectively, which is first supplied to a decoder 66. The decoder 66 determines the frame number or the frame position of the frame in the sequence of frames representing the film from the received time code or synthesis time code, respectively.

The number or position, respectively, is supplied to an activation controller 68 to which simultaneously the word clock 50 (FIG. 4) is supplied. The activation controller 68 in one embodiment of the present invention is implemented in order to provide an activation signal to the audio buffer 64, when on the other hand the decoded frame number or frame position, respectively, was received by means 68 and when on the other hand a next defined event follows in the clock cycle of the word clock 50. This event is, for example, a rising clock edge, a falling clock edge or a zero passing.

The activation signal causes the first audio sample for the frame determined by the decoder 66 to be output. Then, so to speak, automatically controlled by the word clock in every new word clock cycle a further audio sample is output. The audio output is performed until the activation controller 68 provides a new activation signal to the audio buffer, which indicates that a next synthesis time code was decoded and supplied to the activity controller.

Should at this point in time audio samples still be in the buffer 64 which are provided for the frame i, although the output of the samples for the frame i+1 is already requested, then a modification controller 70 is implemented to discard the remaining samples for the frame i present in the buffer, i.e. not to output the same but to directly continue with the samples for the frame i+1. If the buffer 64 is empty, however, although no new activation signal has been received from the activation controller 68, then the modification controller 70 is implemented to repeat the last audio sample drawn from the buffer 64 to fill the resulting gap. Of course, also other measures may be taken to fill the gap, for example an interpolation of samples, a pause, etc.

The functionality of the modification controller 70 is illustrated in FIG. 7a for the case in which no samples are still in the buffer, although already a new activation signal is present due to the reception of a new synthesis time code. In contrast to that, FIG. 7b shows the case in which the buffer is already empty, but the time code for the next frame is not yet there.

FIG. 5 shows an alternative implementation for the "distribution" of the regenerated time code of FIG. 4. Preferably, for the embodiment shown in FIG. 5, the data transmission format according to the standard IEEE 1394 is used. This standard is characterized in that the clock is a constant clock, like, for example, a clock with a frequency of 8 kHz. For this, a sample rate converter 72 is provided which converts the varying word clock 50, as it was explained, to the low-frequency clock with the frequency of 8 kHz 74. The conversion of the sample rate converter 72 here preferably takes place such that the word clock 50 adapted to the film is synchronized to the IEEE 1394 clock 74. This is preferably performed using the sample rate converter 72 as a hardware solution. An audio processing means 76, corresponding to the audio processing means 24 of FIG. 1, thus obtains the IEEE 1394 clock on the one hand, the word clock 50 on the other hand and the sequence of synchronization time codes or manipulated synchronization time codes, respectively, in order to lay any audio channels onto one transmission bus 78 accurate in time, in contrast to the embodiment shown in FIG. 4. Any downstream signal processor/converter combinations 80a, 80b access the transmission bus 78 and extract the audio channel provided for them from the same, in order to supply the same then to the downstream amplifier and finally to the associated loudspeaker panel.

In an alternative embodiment of the present invention, an optical sound track, also referred to as mono-downmix, is not imprinted with the time codes in order to have the same still available. The other optical sound track is used in order to have the time code imprinted. A 2-channel-reader then reads the sound from the one track (mono-downmix) and the time code from the other track.

Again, alternatively, the analog time code may also be imprinted on other locations still free of the film. Thus, the compatibility with conventional film material with regard to the optical sound is given. For reading out the time code, an additional reader is provided or part of the optical sound reader or the complete optical sound reader is reprogrammed.

In order to obtain the analog optical sound track, which may be desirable for compatibility reasons, the time code may also be embedded into the analog sound as a watermark, i.e. in the sense of a buried data channel. Here, such a spectral weighting of the time code is performed that a psychoacoustic masking threshold of the sound signal imprinted on the analog track is greater than or equal to the energy of the time code, so that the analog sound may on the one hand be reproduced free from distortion and that on the other hand from the imprinted "analog sound signal" by optical decoding of the "analog sound signal" and by a subsequent extraction of the inaudibly embedded time code the sequence of detected time codes may be detected at the output of means 10 of FIG. 1.

Corresponding encoders for embedding the time code and decoders for extracting the time code are required in this case.

As it was already discussed, it is preferred to have a redundancy of time code tracks on the film. It is thus preferred to imprint the time code twice onto the film, i.e. for example imprint both optical sound tracks with the analog time code and then after an optical detection of the time code sum up the output signals of the photodiodes 42a, 42b in FIG. 5. Thus, errors on the optical sound track or on one of the two optical sound tracks or on both optical sound tracks may be compensated.

A reliable redundancy is also achieved by sampling the two time code tracks separately and then further processing the most probable time code in time code decoding by error recognition.

Depending on the circumstances, the inventive method for synchronizing an audio signal present in discrete samples with a film may be implemented in hardware or in software. The implementation may take place on a digital storage medium, in particular a floppy disc or a CD with electronically readable control signals which may cooperate with a programmable computer system so that the method is performed. In general, the invention thus also consists in a computer program product having a program code stored on a machine-readable carrier for performing the inventive method, when the computer program product runs on a computer. In other words, the invention may also be realized as a computer program having a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for synchronizing an audio signal present in discrete samples with a film comprising a sequence of frames that may be played with a frame frequency, wherein each frame comprises an imprinted time code indicating a position of the frame in the sequence of frames, and wherein a predetermined number of discrete samples of the audio signal is associated with a frame, comprising:
   a detector for detecting the imprinted time codes for the sequence of frames in order to obtain a detected sequence of time codes;
   a time code generator which is implemented to generate a sequence of synthesis time codes based on an initial value;
   a decoder for decoding a time code of the detected sequence of time codes in order to provide the initial value for the time code generator;
   a comparator for comparing the sequence of synthesis time codes with the detected sequence of time codes;
   a time code manipulator for changing a time length of a synthesis time code of the sequence of synthesis time codes in order to obtain a manipulated synthesis time code when the comparator determines a phase deviation between a time code of the detected sequence of times codes and a synthesis time code of the sequence of synthesis time codes which exceeds a predetermined deviation threshold value with regard to its amount; and
   an audio processor for a time-controlled provisioning of the predetermined number of discrete samples of the audio signal associated with a frame when the audio processor detects a synthesis time code or a manipulated synthesis time code identifying the frame.

2. The device according to claim 1, further comprising:
   a generator for generating a word clock having a word clock frequency based on the detected sequence of time codes, so that the word clock frequency is adapted to the frame frequency,
   wherein the time code generator is implemented to be clocked by the word clock.

3. The device according to claim 1, wherein the audio processor is implemented to provide the discrete samples for a frame according to the word clock or according to a clock derived from the word clock.

4. The device according to claim 1, wherein the audio processor comprises an activation controller which is implemented to perform the provisioning of the samples when a synchronization time code or a manipulated synchronization time code is decoded and when further a word clock or a clock derived from the word clock comprises a defined clock event.

5. The device according to claim 1, wherein the audio processor comprises a modification controller which is implemented to discard at least one sample for a frame in the case of a manipulated synthesis time code which is shorter in time that a non-manipulated synthesis time code, and
   in the case of a manipulated synthesis time code which is longer in time than a non-manipulated synthesis time code, to generate at least one sample for a frame.

6. The device according to claim 5, wherein the at least one generated sample is a copy of the last sample for the corresponding frame.

7. The device according to claim 1, wherein the time code manipulator is implemented in order to restart the time code generator, in case of exceeding the deviation threshold value, with an initial value which indicates a position of a frame following the frame for which the deviation was determined.

8. The device according to claim 2, wherein the time code manipulator is implemented to change a manipulated time code only by at most a number of word clock cycles with regard to a non-manipulated time code.

9. The device according to claim 8, wherein the number of clock cycles includes exactly one clock cycle of the word clock.

10. The device according to claim 1,
   wherein the audio signal comprises a plurality of audio channels for different loudspeakers, wherein the audio channels are stored in separate files, and
   wherein the device comprises a plurality of audio processors, wherein each audio processor is implemented to provide an audio channel,
   wherein the device further comprises a distributor which is implemented to copy a sequence of synthesis time codes and manipulated synthesis time codes and to distribute the copies to the plurality of audio processors.

11. The device according to claim 1, wherein the audio signal comprises a plurality of audio channels for different loudspeakers, wherein the audio channels are stored in separate files,
   wherein the audio processor comprises a central provider in order to provide the plurality of audio channels to a transmission bus controlled with regard to time, and
   wherein the audio processor further comprises a plurality of playing devices which are coupled to the transmission bus.

12. The device according to claim 11, wherein the transmission bus is a fire-wire-bus according to a standard IEEE 1394.

13. The device according to claim 1,
wherein the detector for detecting is implemented to perform an optical detection of the time codes.

14. The device according claim 1,
wherein the time code is embedded into an optical sound track on the film,
wherein the detector for detecting is implemented to optically detect the optical sound track to obtain a sound signal and to extract the time code from the sound signal.

15. The device according to claim 1, wherein on the film at least two equal time codes are present for a frame, and
wherein the detector for detecting is implemented to detect both time codes for a frame and to provide an error-corrected time code for the frame on the basis of the two detected time codes which may be supplied to the decoder and the comparator.

16. The device according to claim 15, wherein the detector for detecting is implemented to sample both time codes separately for one frame so that one time code of the two separately sampled time codes which comprises less errors than the other time code may be used, or wherein the detector for detecting is implemented to sum up the two detected time codes in an analog way.

17. A method for synchronizing an audio signal present in discrete samples with a film comprising a sequence of frames that may be played with a frame frequency, wherein each frame comprises an imprinted time code indicating a position of the frame in the sequence of frames, and wherein a predetermined number of discrete samples of the audio signal is associated with a frame, comprising:
    detecting the imprinted time codes for the sequence of frames in order to obtain a detected sequence of time codes;
    generating a sequence of synthesis time codes based on an initial value;
    decoding a time code of the detected sequence of time codes in order to provide the initial value;
    comparing the sequence of synthesis time codes with the detected sequence of time codes;
    changing a time length of a synthesis time code of the sequence of synthesis time codes in order to obtain a manipulated synthesis time code when a phase deviation between a time code of the detected sequence of times codes and a synthesis time code of the sequence of synthesis time codes is determined which exceeds a predetermined deviation threshold value with regard to its amount; and
    providing the predetermined number of discrete samples of the audio signal associated with a frame in response to a detection of a synthesis time code or a manipulated synthesis time code identifying the frame.

18. A computer program having a program code for performing a method, when the program runs on a computer, for synchronizing an audio signal present in discrete samples with a film comprising a sequence of frames that may be played with a frame frequency, wherein each frame comprises an imprinted time code indicating a position of the frame in the sequence of frames, and wherein a predetermined number of discrete samples of the audio signal is associated with a frame, the computer program being stored on a computer-readable medium, the computer-readable medium comprising:
    instructions for detecting the imprinted time codes for the sequence of frames in order to obtain a detected sequence of time codes;
    instructions for generating a sequence of synthesis time codes based on an initial value;
    instructions for decoding a time code of the detected sequence of time codes in order to provide the initial value;
    instructions for comparing the sequence of synthesis time codes with the detected sequence of time codes;
    instructions for changing a time length of a synthesis time code of the sequence of synthesis time codes in order to obtain a manipulated synthesis time code when a phase deviation between a time code of the detected sequence of times codes and a synthesis time code of the sequence of synthesis time codes is determined which exceeds a predetermined deviation threshold value with regard to its amount; and
    instructions for providing the predetermined number of discrete samples of the audio signal associated with a frame in response to a detection of a synthesis time code or a manipulated synthesis time code identifying the frame.

* * * * *